United States Patent
Orris et al.

(10) Patent No.: US 10,312,721 B2
(45) Date of Patent: Jun. 4, 2019

(54) VEHICLE UNLOCKING SYSTEMS DEVICES AND METHODS

(71) Applicant: Ford Global Technologies, LLC, Dearborn, MI (US)

(72) Inventors: David Joseph Orris, Southgate, MI (US); Nunzio DeCia, Northville, MI (US); Stephen Jay Orris, New Boston, MI (US); David A. Herman, Southfield, MI (US); Howard Paul Tsvi Linden, Southfield, MI (US); Nicholas Alexander Scheufler, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/615,600

(22) Filed: Jun. 6, 2017

(65) Prior Publication Data

US 2018/0351388 A1 Dec. 6, 2018

(51) Int. Cl.
*B60R 25/00* (2013.01)
*H02J 7/02* (2016.01)
*H02J 50/90* (2016.01)
*G07C 9/00* (2006.01)
*H02J 7/00* (2006.01)

(52) U.S. Cl.
CPC .......... *H02J 7/025* (2013.01); *G07C 9/00007* (2013.01); *G07C 9/00896* (2013.01); *H02J 50/90* (2016.02); *G07C 2009/00603* (2013.01); *H02J 2007/0001* (2013.01)

(58) Field of Classification Search
CPC .. H02J 7/025; H02J 50/90; H02J 2007/00001; G07C 9/00007; G07C 9/00896; G07C 2009/00603
USPC ................. 340/5.42, 5.53, 5.61, 5.72, 425.6; 307/104; 320/108
See application file for complete search history.

(56) References Cited

U.S. PATENT DOCUMENTS

| | | |
|---|---|---|
| 7,869,824 B2 | 1/2011 | Min |
| 8,816,636 B2 | 8/2014 | Shinde et al. |
| 9,356,659 B2 | 5/2016 | Partovi |
| 9,518,408 B1 | 12/2016 | Krishnan |

(Continued)

FOREIGN PATENT DOCUMENTS

| | | |
|---|---|---|
| EP | 3144904 A2 | 3/2017 |
| WO | WO 2018105308 A1 | 6/1918 |

(Continued)

OTHER PUBLICATIONS

Search Report dated Nov. 9, 2018 for GB Patent Application No. GB 1809124.9 (3 pages).

*Primary Examiner* — Ojiako K Nwugo
(74) *Attorney, Agent, or Firm* — Frank Lollo; Neal, Gerber & Eisenberg LLP; James P. Muraff

(57) ABSTRACT

Systems, devices, and methods are disclosed for unlocking a vehicle. An example vehicle includes a power system, a remote unlock system controlled by a remote unlocking device, and a door applique. The door applique comprises a wireless charger coupled to the power system, configured to charge the remote unlocking device, and a ridge configured to engage the remote unlocking device, wherein the wireless charger is configured to charge the remote unlocking device for a limited time.

22 Claims, 3 Drawing Sheets

(56) References Cited

U.S. PATENT DOCUMENTS

| | | | | |
|---|---|---|---|---|
| 2003/0232214 | A1* | 12/2003 | Veerasamy | C23C 14/0015 428/626 |
| 2008/0157556 | A1* | 7/2008 | Henderson | B60R 5/00 296/37.6 |
| 2010/0253535 | A1* | 10/2010 | Thomas | H04B 1/082 340/4.37 |
| 2013/0147426 | A1 | 6/2013 | Misono | |
| 2013/0249479 | A1* | 9/2013 | Partovi | H02J 7/025 320/108 |
| 2013/0249682 | A1* | 9/2013 | Van Wiemeersch | B60R 25/1004 340/426.24 |
| 2014/0104771 | A1* | 4/2014 | Colan | G08C 17/02 361/679.4 |
| 2014/0176057 | A1* | 6/2014 | Van Wiemeersch | H02J 7/0044 320/108 |
| 2014/0203770 | A1* | 7/2014 | Salter | H02J 7/0047 320/108 |
| 2014/0242971 | A1 | 8/2014 | Aladenize et al. | |
| 2014/0347009 | A1* | 11/2014 | Hongo | H02J 17/00 320/108 |
| 2015/0013679 | A1* | 1/2015 | Berthon-Jones | A61M 16/00 128/204.23 |
| 2015/0380975 | A1* | 12/2015 | Kanahara | H02J 7/025 320/108 |
| 2016/0013679 | A1* | 1/2016 | Jeon | H02J 7/0044 320/108 |
| 2016/0056664 | A1* | 2/2016 | Partovi | H02J 7/025 307/104 |
| 2016/0118839 | A1* | 4/2016 | Lee | H02J 50/80 320/108 |
| 2016/0362067 | A1* | 12/2016 | Jodon De Villeroche | B60R 11/0241 |
| 2017/0061714 | A1* | 3/2017 | Odejerte, Jr. | G07C 9/00571 |
| 2017/0136885 | A1* | 5/2017 | Ricci | B60L 11/182 |
| 2017/0136893 | A1* | 5/2017 | Ricci | B60L 11/182 |
| 2017/0306684 | A1* | 10/2017 | Baruco | E05F 15/43 |
| 2018/0001816 | A1* | 1/2018 | Dellock | B60Q 3/20 |

FOREIGN PATENT DOCUMENTS

| | | |
|---|---|---|
| WO | WO 2018186512 A1 | 10/1918 |
| WO | WO 2015054150 A1 | 4/2015 |
| WO | WO 2015066031 A1 | 5/2015 |

\* cited by examiner

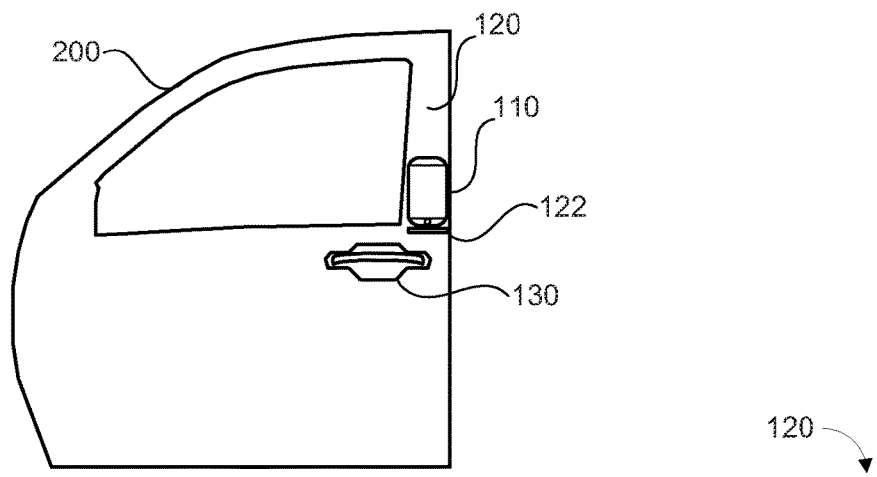
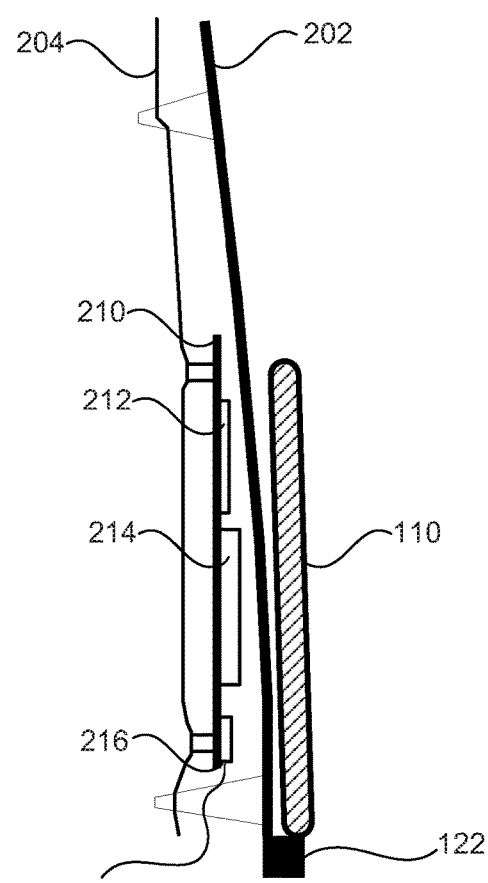
Fig. 2A
Fig. 2B

VEHICLE UNLOCKING SYSTEMS DEVICES AND METHODS

TECHNICAL FIELD

The present disclosure generally relates to vehicle unlocking systems, devices, and methods and, more specifically, charging a remote unlocking device for a vehicle with a wireless charger of the vehicle.

BACKGROUND

A typical vehicle may be unlocked with a key. However in some cases, a user may use a separate device to unlock the vehicle. The separate device may require power to work, and may not be able to unlock the vehicle if the battery is drained.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for remote vehicle unlocking systems, devices, and methods. An example disclosed vehicle includes a power system, a remote unlock system controlled by a remote unlocking device, and a door applique. The door applique comprises a wireless charger coupled to the power system configured to charge the remote unlocking device, and a ridge configured to engage the remote unlocking device, wherein the wireless charger is configured to charge the remote unlocking device for a limited time.

An example disclosed method includes wirelessly charging a remote unlocking device with a wireless charger, wherein the remote unlocking device controls a remote unlock system of a vehicle. The method also includes unlocking the vehicle with the remote unlocking device, wherein the wireless charger is coupled to a door applique of the vehicle having a ridge configured to engage the remote unlocking device, and wherein the wireless charger is configured to charge the remote unlocking device for a limited time.

An example disclosed vehicle door applique may include a wireless charger coupled to a power system of the vehicle, configured to charge a remote unlocking device of the vehicle, and a ridge configured to engage the remote unlocking device, wherein the wireless charger is configured to charge the remote unlocking device for a limited time.

Another example may include means for wirelessly charging a remote unlocking device with a wireless charger, wherein the remote unlocking device controls a remote unlock system of a vehicle. The example may also include means for unlocking the vehicle with the remote unlocking device, wherein the wireless charger is coupled to a door applique of the vehicle having a ridge configured to engage the remote unlocking device, and wherein the wireless charger is configured to charge the remote unlocking device for a limited time.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 2A illustrates an example perspective view of a door of the vehicle of FIG. 1.

FIG. 2B illustrates an example cross-sectional view of an example door applique of a vehicle according to embodiments of the present disclosure.

DETAILED DESCRIPTION OF EXAMPLE EMBODIMENTS

Figure 1:
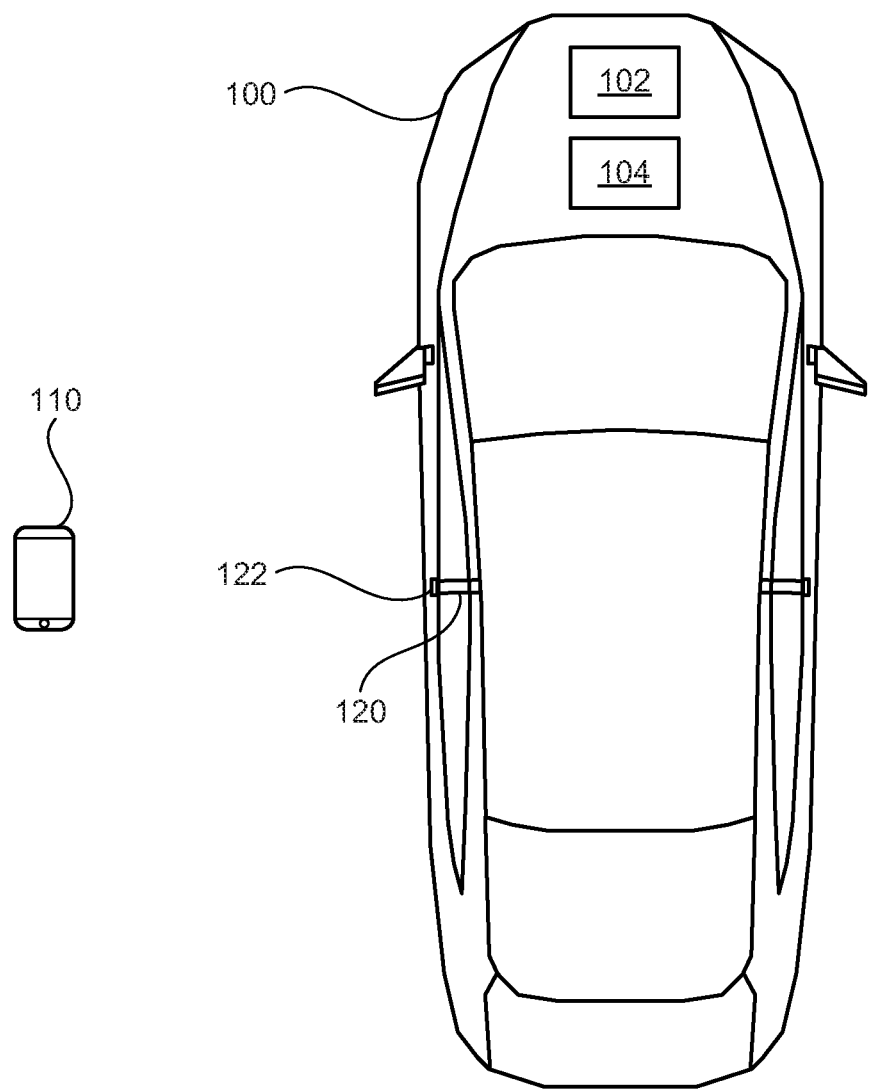
FIG. 1 illustrates an example vehicle and remote unlocking device according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, example devices, systems, and methods disclosed herein relate to wireless charging of a remote unlocking device for a vehicle. Some vehicles may include phone-as-a-key (PAAK) technology, which may facilitate accessing functions traditionally associated with a key fob via an application executing on a smart phone. The smart phone may require power to operate the PAAK application, and as such may not be able to unlock the vehicle if the phone is dead.

In disclosed examples, the vehicle may be locked in an area without access to an outlet or other charging mechanism. A driver may have a dead phone, and may be unable to unlock the car with his or her phone. Thus it may be beneficial to provide a system and device that enables the user to charge his or her phone enough to power on, open the PAAK application, connect to a wireless network (if needed, such as for authentication), and unlock the vehicle.

To accomplish these tasks, an example vehicle may provide a user with the ability to charge his or her phone for a short period of time outside the vehicle, while the vehicle is still locked. The vehicle may provide charging for a limited time to a device outside the vehicle, in order to prevent passersby from draining the battery.

An example vehicle may include a power system, which may include the vehicle battery, fuel cells, and any other power components. The vehicle may also include a remote unlock system, configured to be controlled by a remote unlocking device such as a smart phone with a PAAK application.

The vehicle may also include a wireless charger coupled to the power system, configured to charge the remote unlocking device. The wireless charger may be configured to charge the remote unlocking device outside the vehicle. The wireless charging device may be embedded in a door applique of the vehicle, and oriented such that a remote unlocking device resting against the door applique can be charged. In some cases, the wireless charger may be an aftermarket component, or a component added to the vehicle after the door applique is manufactured. Alternatively, the wireless charger, and/or one or more components of the wireless charger may be embedded in the door applique during manufacturing.

The vehicle may also include a ridge on an outside surface of the vehicle and/or door applique, configured to engage the remote unlocking device. The ridge may be configured to align the remote unlocking device with a charging coil of the wireless charger, which may increase the efficiency of the wireless charger.

In some examples, the vehicle may be configured to charge the remote unlocking device for a limited period of time. For instance, the vehicle may limit the charging time to two minutes during a ten minute time interval. The two minute charging time may be enough charging time to allow the remote unlocking device to boot up, load a PAAK application, and unlock the vehicle. Yet it may be short enough to prevent unnecessary drain on the vehicle power system from one or more other device. This may prevent a person that intends to charge his or her phone for a purpose other than unlocking the vehicle from charging their phone fully at the expense of the vehicle battery.

In some examples, the vehicle may also be configured to perform an authentication action prior to or during charging of the remote unlocking device. The remote unlocking device, though unpowered or "dead," may include one or more devices or components configured to authenticate with the vehicle. For instance, the remote unlocking device may include a near field communication (NFC) tag, a radio frequency identification (RFID) tag, or some other unpowered authentication component. The vehicle may include one or more sensors or systems configured to determine whether the remote unlocking device is approved based on reading the NFC tag, RFID tag, or other component.

Further, in some examples, the vehicle may begin charging the remote unlocking device, and perform an authentication action during the charging. The remote unlocking device may include one or more powered authentication components, which may be activated after a short time being charged by the vehicle. The vehicle may authenticate the remote unlocking device part way through a charging cycle or time interval, and if remote unlocking device is not authenticated may cease the charging function.

FIG. 1 illustrates an example vehicle 100 and remote unlocking device 110 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components.

Vehicle 100 may include a power system 102, a remote unlock system 104, a door applique 120, and a ridge 122. The power system 102 may include one or more batteries, fuel cells, the vehicle alternator, and/or one or more other electrical components.

The remote unlock system may be configured to receive and transmit one or more signals to authenticate a remote unlocking device, and unlock the vehicle. As such, the remote unlocking system may include one or more radio transceivers, encryption/decryption modules, and other software configured to determine whether a remote unlocking device is authenticated and/or whether an unlock command has been received. Remote unlocking system 103 may also include one or more modules or components configured to unlock the vehicle doors and/or transmit an instruction or signal to another component or vehicle system to unlock the vehicle doors.

Door applique 120 may be a component of vehicle 100 configured to include or be coupled to a wireless charger for remote unlocking device 110. The door applique will be described in more detail with respect to FIGS. 2A and 2B.

Remote unlocking device 110 may be any portable device configured to unlock vehicle 100. For example, remote unlocking device 110 may be a smart phone, table, or other mobile device configured to run a remote unlock application. This may be referred to as a phone-as-a-key (PAAK) application.

FIG. 2A illustrates perspective view of a door 200 of vehicle 100. Door 200 may include a door applique 120 and a ridge 122, which may be configured to engage remote unlocking device 110.

FIG. 2B illustrates a cross section view of an example door applique 120 according to embodiments of the present disclosure. The door applique may include an outer surface 202 positioned on an outward facing side of vehicle 100. The outer surface 202 may be comprised of a plastic, composite, or other material. In general it may be beneficial to use a non-conductive material for outer surface 202, to avoid interfering with the charging of the remote unlocking device.

Applique 120 may also include an inner panel 204. The inner panel may be comprised of sheet metal, plastic, a composite material, or any other suitable material. Inner panel 204 may be configured to maintain a distance between wireless charger 210 and the outer surface 202. This distance may be integral to the charging function because the charging efficiency decreases as the distance increase from a charging coil 214 to the device being charger.

Wireless charger 210 may include a chipset 212, configured to control one or more aspects of the wireless charger 210. In some examples, wireless charger 210 may include the ability to authenticate remote unlocking device 110. To enable authentication, chipset 212 may include functionality for detecting one or more NFC tags, RFID tags, and/or other powered or unpowered authentication components. And to accomplish this authentication, wireless charger 210 may include or be communicatively coupled to a processor and/or memory.

The processor may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In some examples, the wireless charger may also include or be communicatively coupled to a communications module. The communications module may allow wireless charger 210 to communicate with one or more systems or devices, including remote unlocking device 210 (for the purpose of authentication, receiving an unlock command, etc.).

The communications module may include wired or wireless network interfaces to enable communication with the external networks. The communications module may also include hardware (e.g., processors, memory, storage, etc.) and software to control the wired or wireless network interfaces. The communications module may include a Bluetooth module, a GPS receiver, a dedicated short range communication (DSRC) module, a WLAN module, and/or a cellular modem, all electrically coupled to one or more respective antennas.

The communications module may also include a wired or wireless interface to enable direct communication with an electronic device (such as a smart phone, a tablet computer, a laptop, etc.).

Wireless charger 210 may include a charging coil 214, configured to wirelessly charge remote unlocking device 110 without contacting or touching the device. In some examples, the charging may occur while vehicle 100 is locked, and while remote charging device 110 is positioned outside vehicle on ridge 122. In some examples, charging coil 214 may include a plurality of coils, such as a three charging coil orientation. The three charging coils may be positioned symmetrically or asymmetrically.

Wireless charger 210 may also include a connector 216, configured to connect to the power system of vehicle 100.

FIG. 2B illustrates wireless charger 210 as being a stand-alone or self-contained device coupled to the inner panel 204 of the door applique 120. But in other embodiments, one or more components or aspects of wireless charger 210 may be embedded in or manufactured with one or more components of door applique 120. For instance, the outer surface 120 may be manufactured such that one or more charging coils 214 are embedded inside. In this manner, one or more components or features of wireless charger may be integrated with door applique 120.

Door applique 120 may also include a ridge 122 configured to engage remote unlocking device 110. The ridge 122 may be a small protrusion from the surface of the vehicle 100, and may be positioned on door applique 120 such that remote unlocking device 110, when placed on the ridge, is aligned with charging coil 214 of the wireless charger 210. In a particular case ridge 122 may be positioned above a door handle 130 of vehicle 100.

Door applique 120 and/or wireless charger 210 may also include one or more other alignment mechanisms, such as one or more magnets configured to align a battery of remote unlocking device 110 with charging coil 214. The magnets may attract one or more components of remote unlocking device 110 such that the battery is aligned with the charging coil.

In some examples, wireless charger 210 may be configured to maintain a particular distance between the charging coil 214 and outer surface 202. The distance may correspond to an optimal distance for wireless charging, which may attenuate rapidly with increasing distance. As such, the wireless charger may be positioned such that there is less than 3 mm separating charging coil 214 from an outside surface of outer surface 202.

Door applique 120 may also be configured to display an indication that the remote unlocking device is in the process of being charged. Door applique 120 and/or wireless charger 210 may include an LED or other display mechanism configured to blink or emit a steady signal in response to a state of the wireless charger. The LED may also change color. For instance, the LED may emit a first color to indicate that remote unlocking device 110 charging is in progress. The LED may emit a second color to indicate that a threshold time of charging has been reached (e.g., two minutes). This second color may enable a user to see that the charging time interval has been met (e.g., a two minute limit for every ten minutes). A third color LED may indicate that the wireless charger is ready to charge again. In practice, a particular example may show a blue light when charging, and after two minutes, change to a red light. The red light may correspond to a state in which the wireless charger is not charging the remote unlocking device, and is waiting for the ten minute time interval to elapse. After ten minutes have elapsed, the light may switch to a green light, to indicate that the wireless charger is ready to charge again. In this example a time of 2 minutes for charging is available every ten minutes. However it should be noted that other time intervals are possible as well.

Door applique 120 and/or wireless charger 210 may also include one or more proximity sensors, touch sensors, or other sensors configured to determine when a remote unlocking device 110 is present. The determined presence of a remote unlocking device may cause one or more actions or functions to occur, including starting a process of charging, for example.

Figure 3:
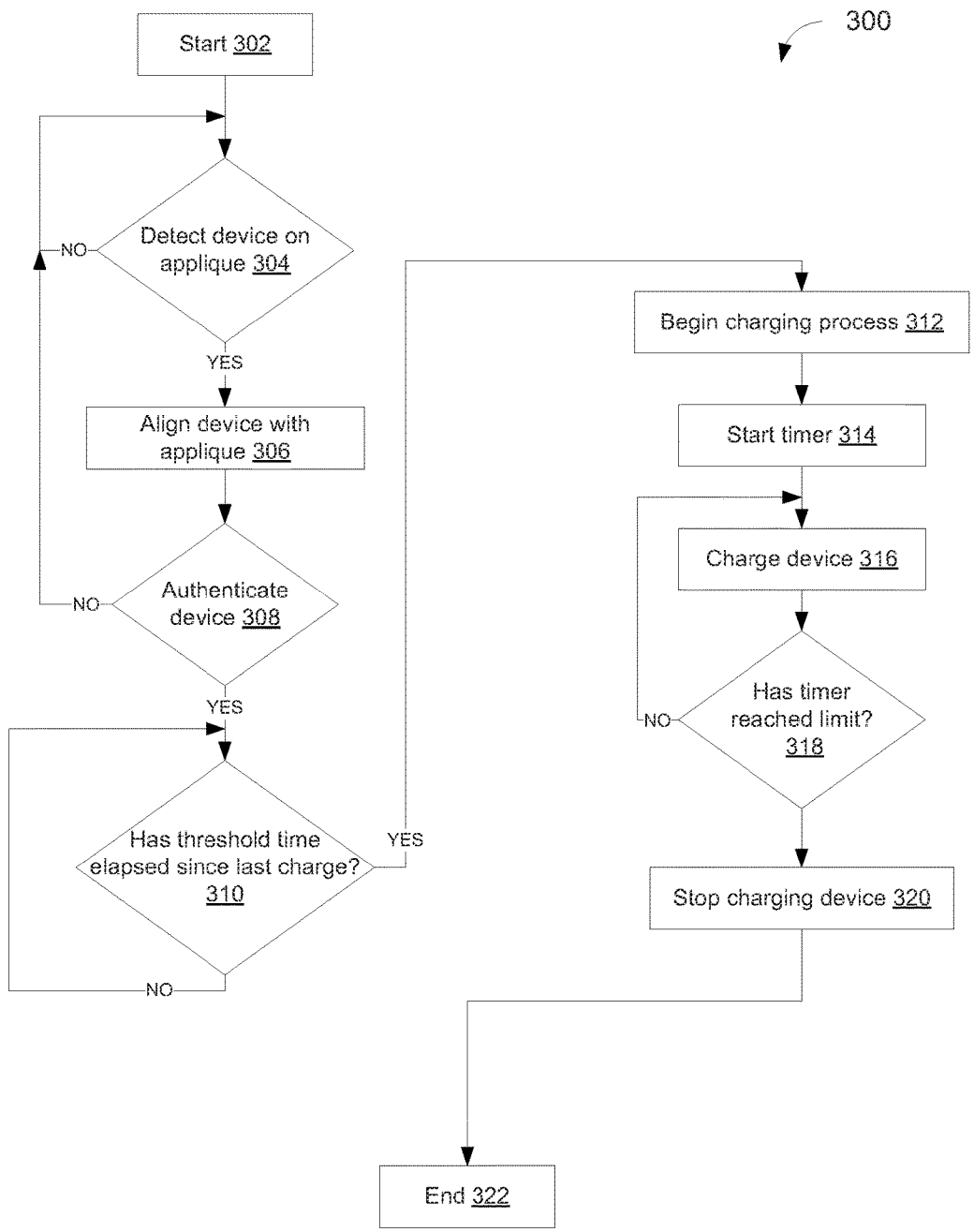
FIG. 3 illustrates a flowchart of an example method according to embodiments of the present disclosure

FIG. 3 illustrates an example method 300 according to embodiments of the present disclosure. Method 300 may enable a remote unlocking device with a drained battery to charge enough to power on and unlock a vehicle. The flowchart of FIG. 3 is representative of machine readable instructions that are stored in memory and may include one or more programs which, when executed by a processor may cause vehicle 100 and/or one or more systems or devices described herein to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1, 2A, and 2B, some functions of those components will not be described in detail below.

Method 300 may start at block 302. At block 304, method 300 may include detecting a device on the applique. This may include receiving data from one or more sensors, such as a proximity sensor, touch sensor, RF sensor, or other sensor.

When a device is detected, block 306 may include aligning the device. This may include the user positioning the device on the ridge, or one or more magnets acting upon the device to align it with the charging coil of the wireless charger.

At block 308, method 300 may include authenticating the device. This may include transmitting and/or receiving signals with the device, such as described above. In some examples, only authorized devices may be charged. As such, if a device is found to be unknown or unrecognized, the wireless charger may not be activated or used to charge the device.

However if the devices is authenticated, method 300 may include determining whether a threshold time has elapsed since a last charging cycle. This threshold time may be ten minutes, for example, or may be any other period of time. If the threshold time has not been met, method 300 may include waiting until the threshold time has elapsed.

At block 312, method 300 may include beginning the charging process. And at block 314, method 300 may include starting a timer. The timer may be set to run for a specific time period, such as two minutes for example.

At block 316, method 300 may include continuing to charge the device. At block 318, method 300 may include determining whether the time has reached the limit. If the timer has not reached the limit, the wireless charger may continue to charge the device. But if the timer has reached the limit, method 300 may include stopping the charging process at block 320. And at block 322, method 300 may end.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a power system;
a remote unlock system controlled by a remote unlocking device; and
a door applique comprising:
a wireless charger coupled to the power system and configured to charge the remote unlocking device until a predetermined period elapses, wherein the predetermined period is less than a total amount of period required to charge the remote unlocking device from empty to full; and
a ridge configured to engage the remote unlocking device.

2. The vehicle of claim 1, wherein the wireless charger is further configured to charge the remote unlocking device outside the vehicle while the vehicle is locked.

3. The vehicle of claim 1, wherein the wireless charger is embedded in the door applique.

4. The vehicle of claim 1, wherein the wireless charger comprises a charge coil positioned less than 3 mm from an outside surface of the door applique.

5. The vehicle of claim 1, wherein the predetermined period is a first period, and wherein the wireless charger is further configured to, responsive to a second period elapsing subsequent to the first period, enable the remote unlocking device or a different remote unlocking device to be charged by the wireless charger.

6. The vehicle of claim 5, wherein the second period is longer than the first period.

7. A vehicle comprising:
a power system;
a remote unlock system controlled by a remote unlocking device; and
a door applique comprising:
a wireless charger coupled to the power system, configured to charge the remote unlocking device; and
a ridge configured to engage the remote unlocking device;
wherein the wireless charger is configured to charge the remote unlocking device for a limited time, and wherein the ridge is positioned above a handle of a door of the vehicle, and is configured to align a battery of the remote unlocking device with a charge coil of the wireless charger.

8. A vehicle comprising:
a power system;
a remote unlock system controlled by a remote unlocking device; and
a door applique comprising:
a wireless charger coupled to the power system, configured to charge the remote unlocking device; and
a ridge configured to engage the remote unlocking device;
wherein the wireless charger is configured to charge the remote unlocking device for a limited time, and wherein the wireless charger is further configured to charge the remote unlocking device for a maximum of two minutes in a ten minute time interval.

9. The vehicle of claim 1, wherein the wireless charger is further configured to authenticate the remote unlocking device and responsively charge the remote unlocking device.

10. A method comprising:
wirelessly charging a remote unlocking device with a wireless charger until a predetermined period elapses, wherein the predetermined period is less than a total amount of a period required to charge the remote unlocking device from empty to full, wherein the remote unlocking device controls a remote unlock system of the vehicle; and
unlocking the vehicle with the remote unlocking device;
wherein the wireless charger is coupled to a door applique of the vehicle having a ridge configured to engage the remote unlocking device.

11. The method of claim 10, wherein the wireless charger is further configured to charge the remote unlocking device outside the vehicle while the vehicle is locked.

12. The method of claim 10, wherein the wireless charger is embedded in the door applique.

13. The method of claim 10, wherein the wireless charger comprises a charge coil positioned less than 3 mm from an outside surface of the door applique.

14. The method of claim 10, further comprising:
authenticating the remote unlocking device; and
responsively charging the remote unlocking device after authentication.

15. A method comprising:
wirelessly charging a remote unlocking device with a wireless charger, wherein the remote unlocking device controls a remote unlock system of a vehicle; and
unlocking the vehicle with the remote unlocking device;
wherein the wireless charger is coupled to a door applique of the vehicle having a ridge configured to engage the remote unlocking device, and wherein the wireless charger is configured to charge the remote unlocking device for a limited time, and wherein the ridge is positioned above a handle of a door of the vehicle, the method further comprising:
aligning a battery of the remote unlocking device with a charge coil of the wireless charger.

16. A method comprising:
wirelessly charging a remote unlocking device with a wireless charger, wherein the remote unlocking device controls a remote unlock system of a vehicle; and
unlocking the vehicle with the remote unlocking device;
wherein the wireless charger is coupled to a door applique of the vehicle having a ridge configured to engage the remote unlocking device, and wherein the wireless charger is configured to charge the remote unlocking device for a limited time, and wherein wirelessly charging a remote unlocking device comprises wirelessly charging the remote unlocking device for a maximum of two minutes in a ten minute time interval.

17. A vehicle door applique comprising:
a wireless charger coupled to a power system of the vehicle, configured to charge a remote unlocking device of the vehicle until a predetermined period elapses, wherein the predetermined period is less than a total amount of period required to charge the remote unlocking device from empty to full; and
a ridge configured to engage the remote unlocking device.

18. The vehicle door applique of claim 17, wherein the wireless charger is further configured to charge the remote unlocking device outside the vehicle while the vehicle is locked.

19. The vehicle door applique of claim 17, wherein the wireless charger comprises a charge coil positioned less than 3 mm from an outside surface of the door applique.

20. The vehicle door applique of claim 17, wherein the wireless charger is further configured to authenticate the remote unlocking device and responsively charge the remote unlocking device.

21. A vehicle door applique comprising:
a wireless charger coupled to a power system of the vehicle, configured to charge a remote unlocking device of the vehicle; and
a ridge configured to engage the remote unlocking device;
wherein the wireless charger is configured to charge the remote unlocking device for a limited time, and wherein the ridge is positioned above a handle of a door of the vehicle, and is configured to align a battery of the remote unlocking device with a charge coil of the wireless charger.

22. A vehicle door applique comprising:
a wireless charger coupled to a power system of the vehicle, configured to charge a remote unlocking device of the vehicle; and
a ride configured to engage the remote unlocking device;
wherein the wireless charger is configured to charge the remote unlocking device for a limited time, and wherein the wireless charger is further configured to charge the remote unlocking device for a maximum of two minutes in a ten minute time interval.

* * * * *